No. 613,486. Patented Nov. 1, 1898.
J. B. BARRODY.
ACETYLENE GAS GENERATOR.
(Application filed May 13, 1898.)
(No Model.)
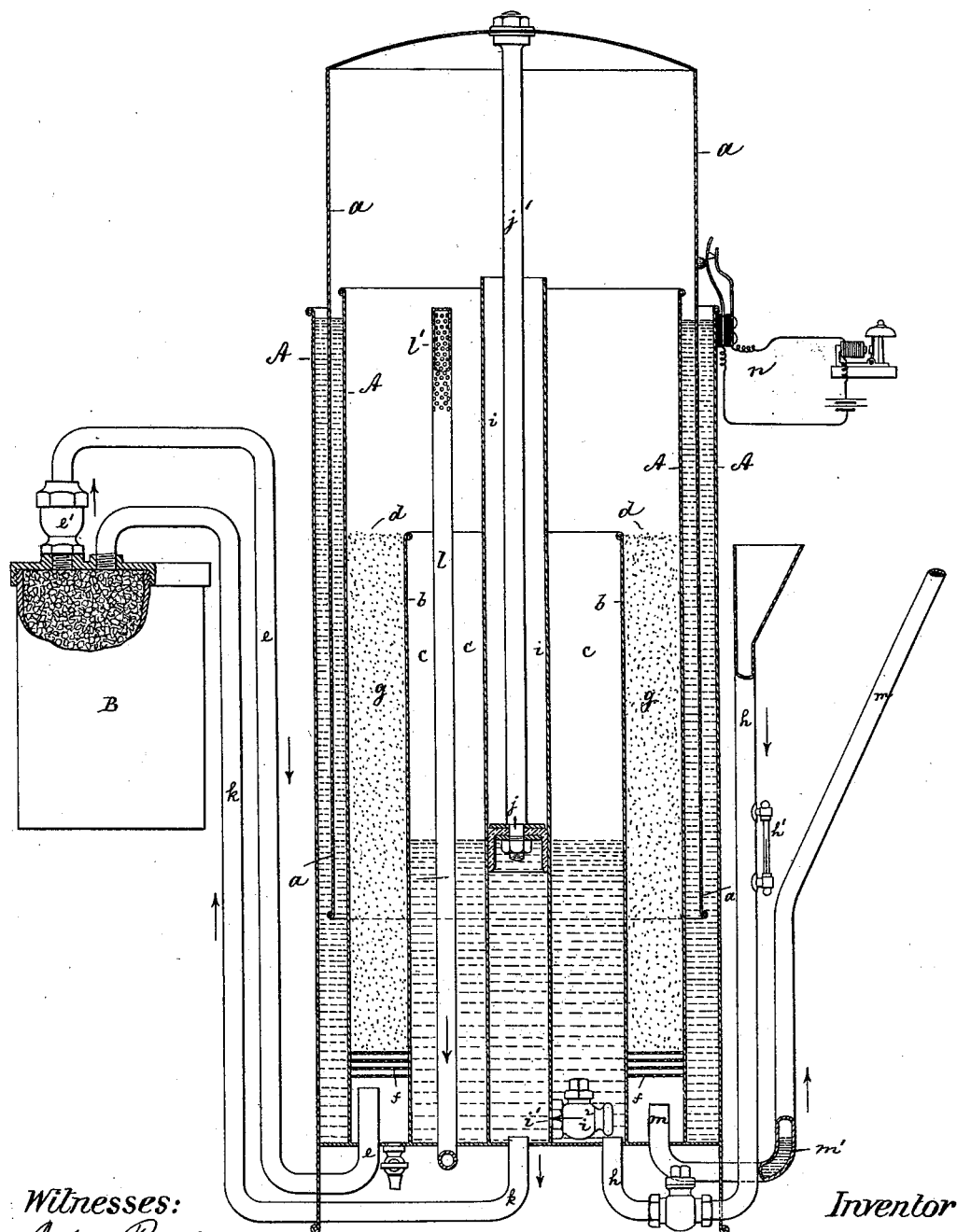
Witnesses:
John Becker
William Schulz
Inventor:
John B. Barrody
by his attorneys
Roeder & Briesen

United States Patent Office.

JOHN B. BARRODY, OF NEW YORK, N. Y., ASSIGNOR OF TWO-THIRDS TO JOSEPH GARCIA AND EMILY M. DUNTON, OF SAME PLACE.

ACETYLENE-GAS GENERATOR.

SPECIFICATION forming part of Letters Patent No. 613,486, dated November 1, 1898.

Application filed May 13, 1898. Serial No. 680,538. (No model.)

*To all whom it may concern:*

Be it known that I, JOHN B. BARRODY, a citizen of the United States, and a resident of New York city, New York, have invented certain new and useful Improvements in Apparatus for Making Acetylene Gas, of which the following is a specification.

This invention relates to an acetylene-gas generator so constructed that the supply of gas will be automatically regulated by the consumption and that danger from explosion is avoided.

The accompanying drawing represents a vertical central section, partly in elevation, of my improved acetylene-gas generator.

The letter A represents a doubly-walled tank or receiver, into the water seal of which dips a gas-holder $a$. A concentric partition $b$ divides the lower part of the tank into an inner water-chamber $c$ and an outer gas-chamber $d$. The outer chamber $d$ communicates at its lower end by pipe $e$, having upwardly-opening check-valve $e'$, with the generator B, within which the carbid of calcium is mixed with the water. Above the mouth of gas-pipe $e$ there are placed within chamber $d$ a number of foraminated metal plates $f$ and a charge of charcoal $g$ for the purpose of purifying or filtering the gas.

$h$ is the water-inlet pipe, having gage $h'$ and delivering the water from a suitable source of supply to the lower end of chamber $c$. Through this chamber there extends centrally a tube or cylinder $i$, having a port $i'$ near its lower end which is controlled by an inwardly-opening check-valve $i^2$. Within the tube $i$ there moves a piston $j$, the rod $j'$ of which is attached to the dome of the gas-holder $a$, so that the piston moves in unison with the gas-holder. The lower end of the tube $i$ communicates by water-pipe $k$ with the generator B, so that water may be forced by the piston into such generator.

$l$ is the service-pipe, having a perforated upper end $l'$ and delivering the gas from the top of receiver A to the burners.

$m$ is a blow-off or safety pipe, having water seal $m'$, which is blown out when the pressure exceeds the safety limit.

$n$ is an electric alarm which goes off when the gas-holder has descended to a point which indicates that the apparatus must be recharged with either carbid of calcium or water.

To start the apparatus, the gas-holder $a$ is somewhat raised and water admitted through pipe $h$ into chamber $c$, from whence it flows through port $i'$ into tube $i$, and thence through pipe $k$ into the generator B. Here it mixes with the carbid of calcium to generate the gas, which will flow through pipe $e$ into chamber $d$, where it is purified and delivered to the pipe $l$. The weight of the gas-holder will maintain the gas at a uniform pressure and upon descending will force the piston $j$ upon the body of water, so as to force the latter into the generator B. Thus it will be seen that the water is injected into the gas-generator only upon the consumption of the gas and that therefore the generation of the gas is in proportion to its consumption. In this way the danger of an overproduction of the gas is avoided, and the apparatus is rendered safe and reliable in its operation.

What I claim is—

An apparatus for making acetylene gas, composed of a tank having a gas-chamber, a water-chamber and a perforated cylinder communicating with the water-chamber, a water-inlet for the water-chamber, an acetylene-gas generator, a water-pipe connecting the cylinder with the same, a gas-pipe extending from the generator to the gas-chamber of the tank, a gas-holder, a piston movable in unison therewith and embraced by the cylinder, substantially as specified.

Signed by me at New York city, New York, this 11th day of May, 1898.

JNO. B. BARRODY.

Witnesses:
 FRANK V. BRIESEN,
 WILLIAM MILLER.